(12) United States Patent
Hong

(10) Patent No.: US 6,520,580 B1
(45) Date of Patent: Feb. 18, 2003

(54) LUMBAR SUPPORT CONTROLLING APPARATUS FOR A CAR SEAT

(76) Inventor: Jung-myung Hong, 1501-202 Seongjeo Village, 2115 Deahwa-dong, Ilsan-gu, Koyang-shi, Kyunggido 411-704 (KR)

( * ) Notice: Subject to any disclaimer, the term of this patent is extended or adjusted under 35 U.S.C. 154(b) by 0 days.

(21) Appl. No.: 09/668,854

(22) Filed: Sep. 25, 2000

(30) Foreign Application Priority Data

Jun. 16, 2000 (KR) ............................................. 00-33252

(51) Int. Cl.$^7$ .......................... A47C 3/025; F16H 29/02
(52) U.S. Cl. ................................... 297/284.4; 74/89.39
(58) Field of Search ...................... 297/284.4; 74/89.39, 74/89.37

(56) References Cited

U.S. PATENT DOCUMENTS

| | | | | |
|---|---|---|---|---|
| 3,106,423 A | * | 10/1963 | Schwarz | 297/284.4 |
| 3,183,733 A | * | 5/1965 | Whicker | 74/89.39 |
| 4,313,637 A | * | 2/1982 | Barley | 297/284.4 |
| 4,465,317 A | * | 8/1984 | Schwarz | 297/284.4 |
| 4,678,230 A | * | 7/1987 | Winkle | 297/284.4 |
| 4,840,425 A | | 6/1989 | Noble | |
| 4,940,284 A | | 7/1990 | Nagasaka | |
| 5,197,780 A | * | 3/1993 | Coughlin | 297/284.7 |
| 5,215,350 A | * | 6/1993 | Kato | 297/284.4 |
| 5,302,002 A | * | 4/1994 | Nagasaka | 297/284.4 |
| 5,518,294 A | * | 5/1996 | Ligon et al. | 297/284.4 |
| 5,954,399 A | * | 9/1999 | Hong | 297/284.4 |

* cited by examiner

Primary Examiner—Gregory J. Strimbu
(74) Attorney, Agent, or Firm—Madson & Metcalf

(57) ABSTRACT

A controlling apparatus for a lumbar support of a car seat for supporting the lumbar region of a driver. The controlling apparatus includes a housing disposed within the seat and having a jaw at one end. A sleeve having a groove in engagement with the jaw includes an internal screw thread. A body having a screw in engagement with the internal screw thread also has a groove at the rear end thereof. A handle outwardly disposes from the seat engages the sleeve. A cable is connected to the housing and to the lumbar support. A release wire is disposed within the cable, one end thereof having a fixation ball attached to the groove of the body, the other end thereof having a fixation pin attached to the lumbar support. An elastic tension spring located between the other one end of the lumbar release wire and a lower flange of the lumbar support, maintains tension of the release wire. A coil spring is disposed between the body and the housing for maintaining elastic tension of the elastic tension spring and the elastic release force of the lumbar support.

1 Claim, 6 Drawing Sheets

LUMBAR SUPPORT CONTROLLING APPARATUS FOR A CAR SEAT

FIELD OF THE INVENTION

The present invention relates to an apparatus for controlling lumbar support in relation to a car seat, and more particularly, to a lumbar support controlling apparatus for a car seat, for buffering impact on lumbar region of drivers at the time of backward collision, thereby improving workability of the steering wheel with less power and achieving comfortable driving with less fatigue.

BACKGROUND OF THE INVENTION

In general, a driver's seat and its assistant seat are separated by means of a console box, which is interposed therebetween. These seats are designed considering comfort to properly support the users by absorbing vibration from the road and thereby reducing fatigue. Because the weight and cost of a seat rate high in relation to the whole car, a lightweight and economical design is required.

In addition, stationery ride comfort permits a driver to take a stable pose when seated in the car, while driving comfort, or dynamic ride comfort, considers the vibration characteristics of the seat while driving, and holding capability permits the driver to keep his stable pose when he turns or drives winding roads.

The construction of the driver's seat and the assistant seat is typically divided into a seat cushion, seat back and headrest. As for the seat cushion and the seat back, it has been widely known that a seat spring is mounted in a seat frame and a trim cover assembly covers the seat frame. A lumbar support may be fixed inside the seat frame of the seats. The lumbar support comprises a support plate for supporting the lumbar region of the passenger and a controller for controlling the support plate.

Because of an upright position of a human being, the man or woman receives much more pressure on the lower backbone than other vertebrae. This occasionally causes pains on the lower backbone or waist when sitting in chairs. The height of people varies during a day, that is, backbone disks swell up at night and compress in the daytime. If the disk as a basic frame of the backbone is not properly supported at the pelvic region, the spinal column, and the shoulder, the unhealthy backbone transformations may occur. The central nervous system serves to control basic life functions such as breathing, circulation of blood, heart pumping, fatigue, and concentration.

In this respect, the lumbar support may have a two-position controllable lever, which is exposed at one side, so that the driver may adjust its height in the seat frame with the lever.

FIG. 1 shows applicant's prior construction of the controlling apparatus of the lumbar support suggested in KR Patent Application 1998-12970 by this inventor. The controlling apparatus is designed for use with a lumbar support, such as shown in FIG. 2.

This type of the controlling apparatus comprises: an adjustor 300' that includes a housing 310' in a hollow cylindrical shape and having a jaw 311' at one end; a sleeve 320' having a groove 321' in engagement with the jaw 311' of the housing 310' for rotation and having an internal thread 322'; a body 330' on which a screw 331' is formed to engage with the internal thread 322' and having a groove 332' at the other end; handle 340' outwardly exposed, from the seat back, in engagement with the sleeve 320' for rotation; cable 350' made of the flexible material, connected to the housing 310' and one flange of the support plate; and release wire 360' protruded within the cable 350', one end having a fixation ball 361' suspended on the groove 332' of the body 330', the other end having a fixation pin 362 to suspend the other flange of the locking member 40, such as those shown in FIG. 2.

In case that the handle 340' is rotated in a desired direction, the sleeve 320' having the groove 324' corresponding to the protrusions 344' of the handle 340' is rotated in the same direction, and the body 330' in engagement with the internal screw thread 322' in the sleeve 320' moves relative to the sleeve 320'. To prevent the movable body 330' from rotating with the sleeve 320', the movable body 330' has a guide protrusion 333', and the housing 310' has a longitudinal guide groove 313' for guiding the guide protrusion 333' to be moved forward and backward.

Within the housing 310', the fixation ball 361' inserted into the groove 332' of the body 330', allows the fixation ball 361 and release wire 360' to move integrally with the body 330'. By moving the release wire 360' connected to the fixation ball 361', the spacing between both flanges 43 of the locking member 40 is varied to cause the support plate 10 to protrude or bend outward in the center part thereof.

Between the flange 43 and the end of the release wire 360', a spring is mounted as a tension means 400 to strongly pull the release wire 360' with use of elasticity of the spring and reverting power of the support plate 10.

In applicant's prior lumbar support controlling apparatus, the release wire 360' is connected to the fixation ball 361' to be inserted to the groove 332'. Spring elasticity of the tension means 400 and reverting power of the support plate 10 affect the body 330'.

The screw 331' of the body 330' is in strong engagement with the internal screw thread 322' of the sleeve 320' each other. The motion of movement becomes slow due to frictional resistance of the protrusions and the groove.

This makes the handle 340' and the sleeve 320' to be actuated by strong forces, thereby making it difficult for the old or the feeble to readily handle the apparatus.

Due to lack of workability, the lumbar support does not fully satisfy the driver's need to reduce fatigue during extended travel by variably supporting the lumbar region of the driver and cannot adjust the precise lumbar support height depending on the driver's conditions and thus the driver feels discomfort in driving.

SUMMARY OF THE INVENTION

The present invention is derived in order to resolve the problems of the prior art and has an object to provide a lumbar support controlling apparatus for a car seat with less power to improve workability and convenience.

The present invention has the other object to provide an improved lumbar support controlling apparatus for a car seat for adjusting an angle of the lumbar support to facilitate comfort driving.

In order to achieve the above objects of the present invention, there is provided a controlling apparatus for a lumbar support. The lumbar support comprises a support plate 10 which may protrude or bend in the center part thereof by selective curving and which has locking holes 12 at both upper and lower end parts of its main body. The support plate has a plurality of support wings 11 extending outwardly therefrom. The support plate may be an elastic plate spring interposed between upper and lower seat frames 2 of a car seat 1 for supporting lumbar region of a driver. Locking member 40 is fixed to the seat frames 2 by the locking holes 12 at the upper and lower end parts of the support plate 10. The housing 310 may be disposed within the seat 1, in a hollow cylindrical shape and having a jaw 311 at one end thereof. The controlling apparatuscontrols the height of the support plate 10 for supporting the lumbar region by controlling the spacing between the upper and lower flanges 43 of the locking member 40. A sleeve 320 has a groove 321 in engagement with the jaw 311 of the housing 310 and includes all internal screw thread 322 inside the sleeve 320. A body 330 has a screw 331 in engagement with the internal screw thread 322 of the sleeve 320 and includes a groove 332 at the rear end thereof. A handle 340 extends outwardly from the seat 1 and is in engagement with the sleeve 320 for rotation. A cable 350 made of flexible material, is connected to the housing 310 and to one flange 43 of the support plate 10. A release wire 360 is disposed within the cable 350, one end having a fixation ball 361 attached to the groove 332 of the body 330, the other end having a fixation pin 362 that may be attached to the other flange 43 of the locking member 40. A resilient tension spring 400 located between an end of the release wire 360 and the lower flange 43 of the support plate 10, maintains tension of the release wire 360. An elastic member 80 between the body 330 and the housing 310, for maintaining elastic tension of the tension means 400 and the elastic release force of the support plate 10.

The body 330 and the handle 340 are facilitated by maintaining the elastic spring of the tension means 400 and release force of the support plate 10 by the elastic member 80.

DETAILED DESCRIPTION OF THE PREFERRED EMBODIMENTS

Figure 1:
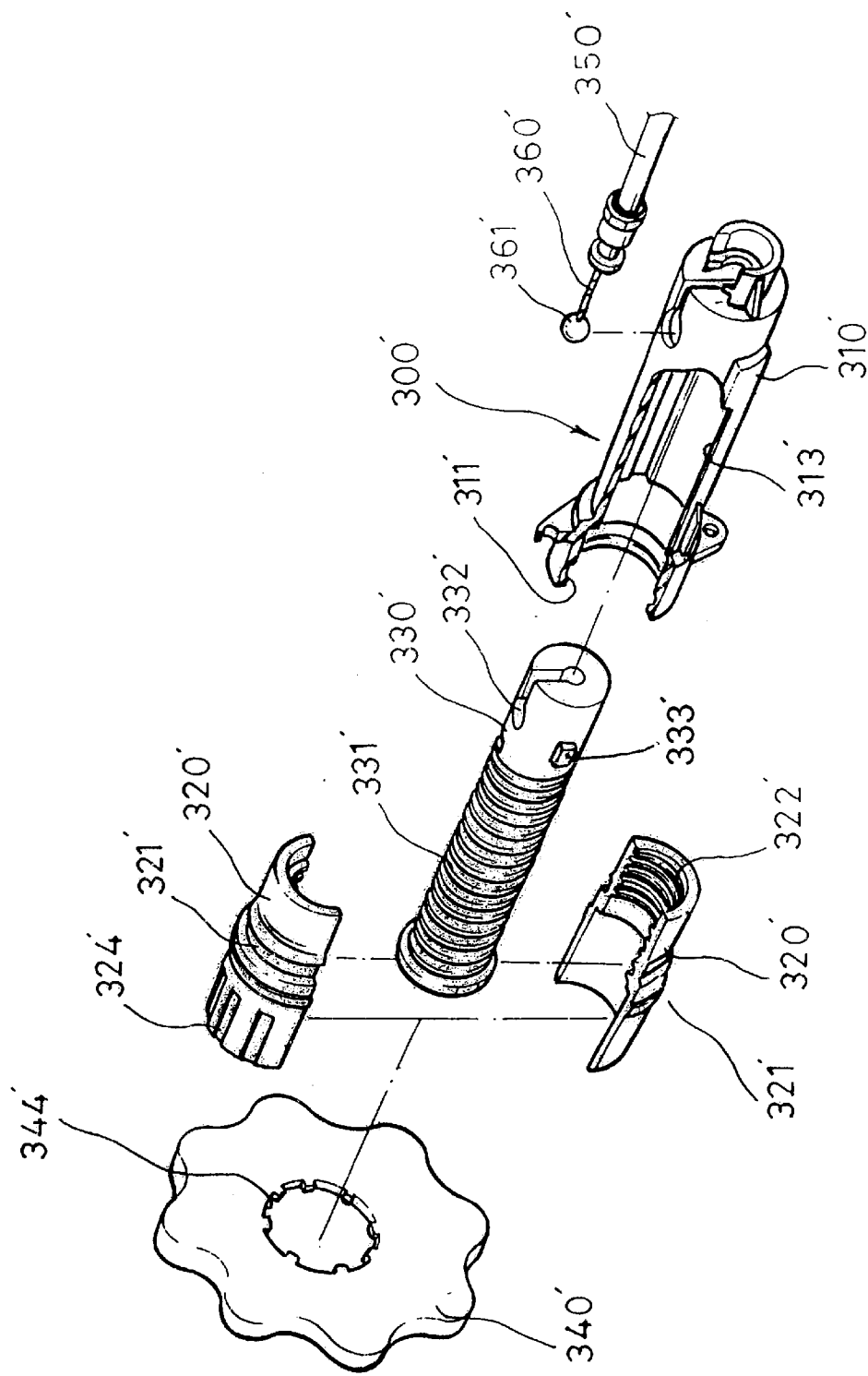
FIG. 1 is an exploded view in partial of the prior art lumbar support controlling apparatus.
Figure 2:
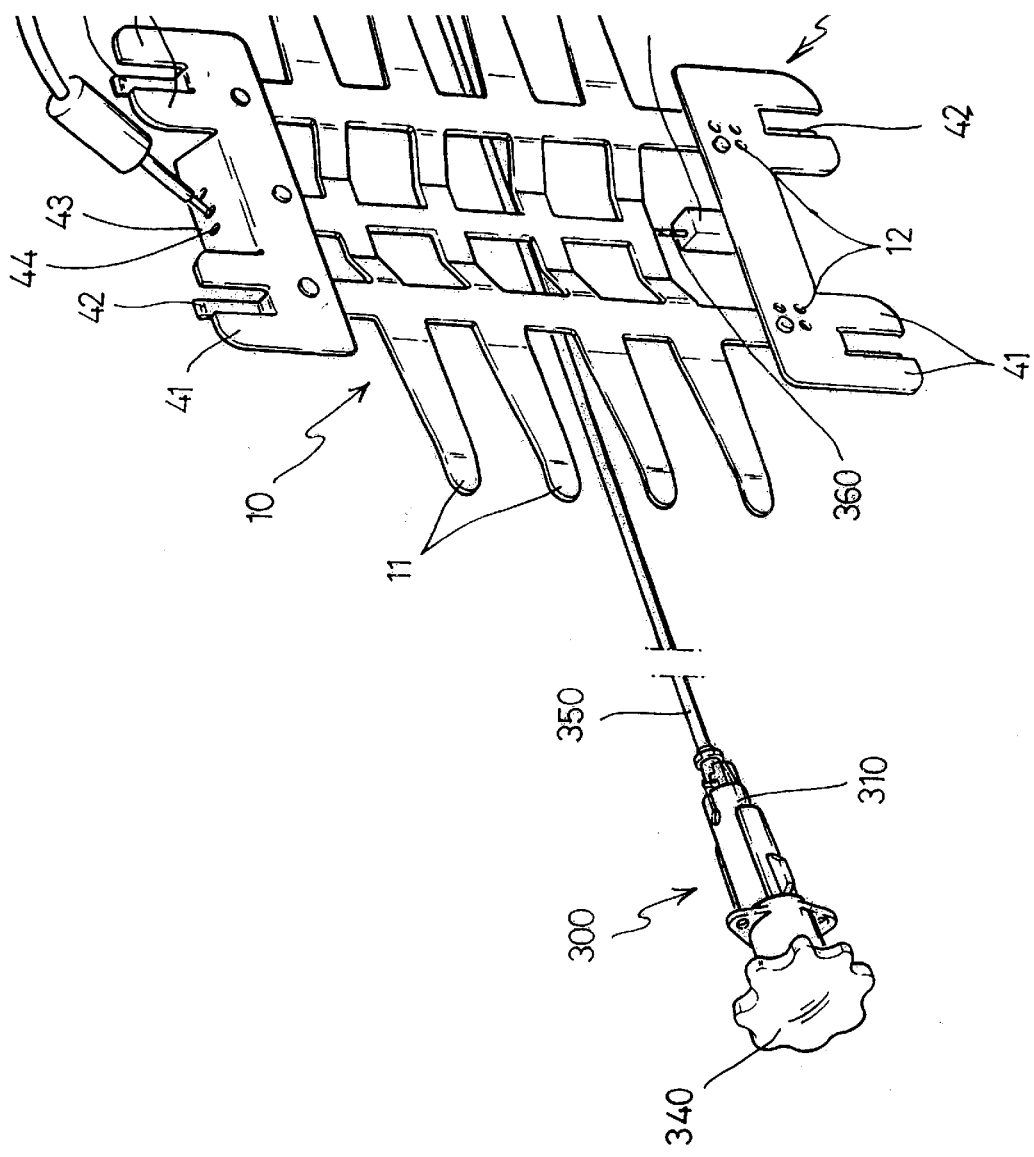
FIG. 2 is a schematic perspective view of lumbar support according to the present invention in which the front and rear fixings pieces are fixed by the groove at both ends of the support plate having a plurality of support wings, the release wire is engaged with the connecting groove on the flange inner curvedly formed, and the handle are controllably exposed from the controlling apparatus at both ends of the cable connected to the release wire.

As shown in FIG. 2, the present invention concerns a construction of the lumbar support for adjustably supporting the lumbar region of the driver or passenger. The lumbar support is installed within the car seat, and it comprises a support plate 10 made of elastic plate material for buffering impact or vibration, and a controlling apparatus 300 for controlling the support plate 10 to the desired state.

At the upper and lower parts of the support plate 10, the locking member 40 is formed to easily fix with the seat frame 2.

On one side of the locking member 40, a fixation means is formed to engage the locking holes 12 at the upper and lower portions of the support plate 10.

The front and rear fixing pieces 41 and 42 are formed in pair at both side parts of the locking member 40 to be inserted into the seat frame 2 for fixation with the support plate 10.

The front fixing pieces 41 are formed at both ends with respect to the center. The rear fixing pieces 42 are formed between each pair of the front fixing pieces 41. Specifically, both ends of the locking member 40 are divided by three and the center portion is made to fold backward and then forward in parallel with the front fixing pieces 41 for firm fixation with the seat frame 2.

Formed at both sides of the rear fixing pieces 42 are the front fixing pieces 41, whereas the rear fixing pieces 42 serve to support the seat frame 2. The rear fixing pieces 42 are located between the pair of front fixing pieces 41 in opposite of the locking member 40, so that the front and rear fixing pieces 41 and 42 serve to firmly fix the support plate 10 at both sides to prevent the seat frame 2 from the support plate 10 when impact or shift of the weight of a driver is applied. That is, the front fixing pieces 41 function to prevent disengagement with the seat frames 2 in pair at both sides of the locking member 40 for reinforcing the front part of the seat frame 2 in case overload of the driver or external impact is applied to the front side of the supporting plate 10.

A couple of the locking members 40 are fixed on upper and lower seat frames 2 by use of the front and-rear fixing pieces 41 and 42 to support the support plate 10 to achieve simple attachment/detachment.

Flanges 43 having the connecting groove 44 are formed on the upper and lower locking members 40 to inwardly fold with a predetermined angle. The flanges 43 serve the support plate 10 to curve by manipulating the lumbar support controlling apparatus 300. The connecting groove 44 at the lower side of the flange 43 is to fix the release wire 360 which is variable by manipulating tile lumbar support controlling apparatus 300. The release wire 360 is located within the malleable cable 350, one end of which having a fixation ball 361.

The controlling apparatus 300 in engagement with the fixation ball 361 is fixed within the seat, in which the hollow cylindrical housing 310 having the jaw 311 at one end in engagement with the groove 321 is connected to the sleeve 320 having the internal thread 322 inside thereof The sleeve 320 is inserted in the housing 310.

One end of the sleeve 320 is engaged with the jagged portion 341 in the handle 340, on which the grooves 342 are formed.

On the body 330 the screw 331 is formed to engage with the internal thread 322. The other end of the body 330 forms the groove 332 for fixing the fixation ball 361 formed at the end of the release wire 360.

The body 330 is rotatably inserted within the sleeve 320 and outwardly exposed from the exterior to the car seat 1. The grooves 342 of the sleeve 320 engage with the jagged portion 341 of the handle 340.

Figure 3:
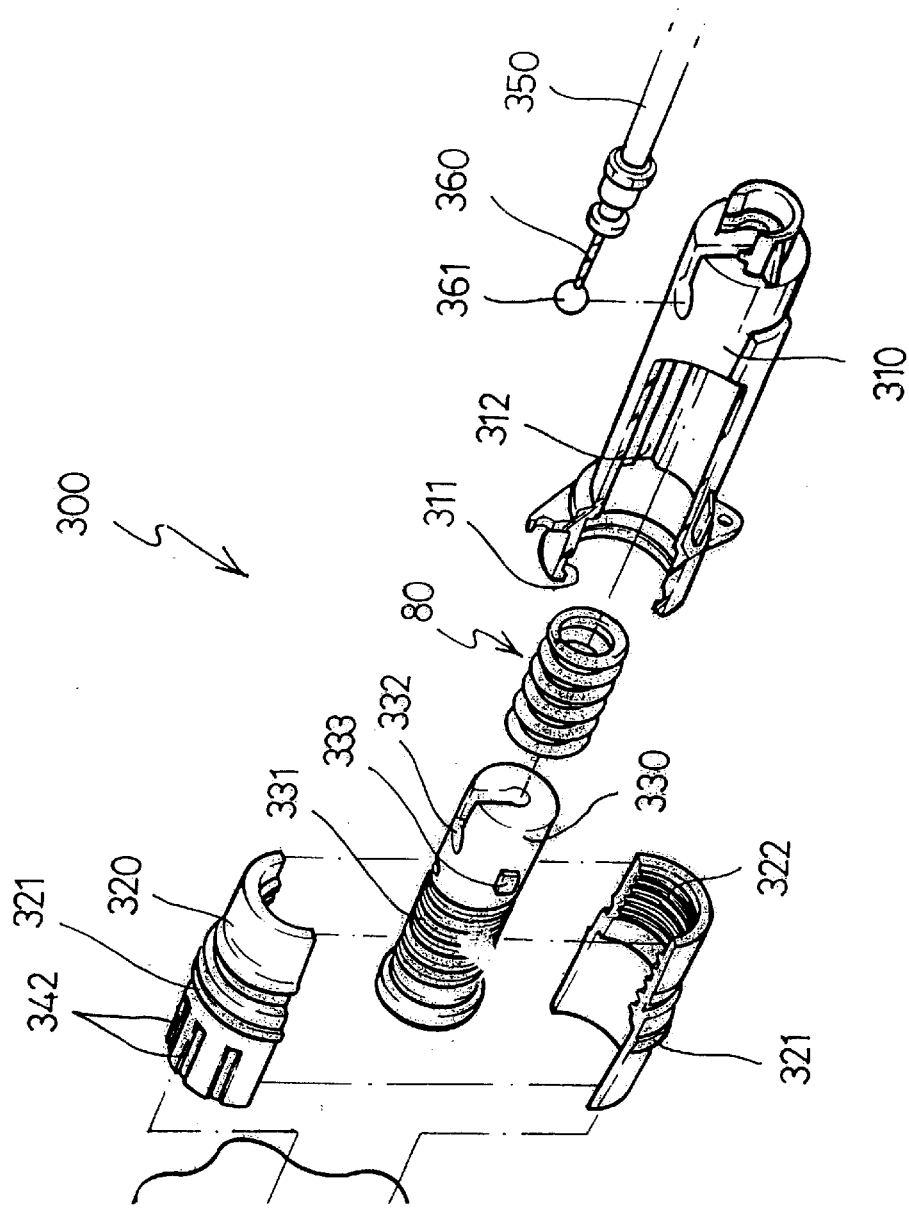
FIG. 3 is an exploded view in partial of the lumbar support controlling apparatus according to the present invention.
Figure 4:
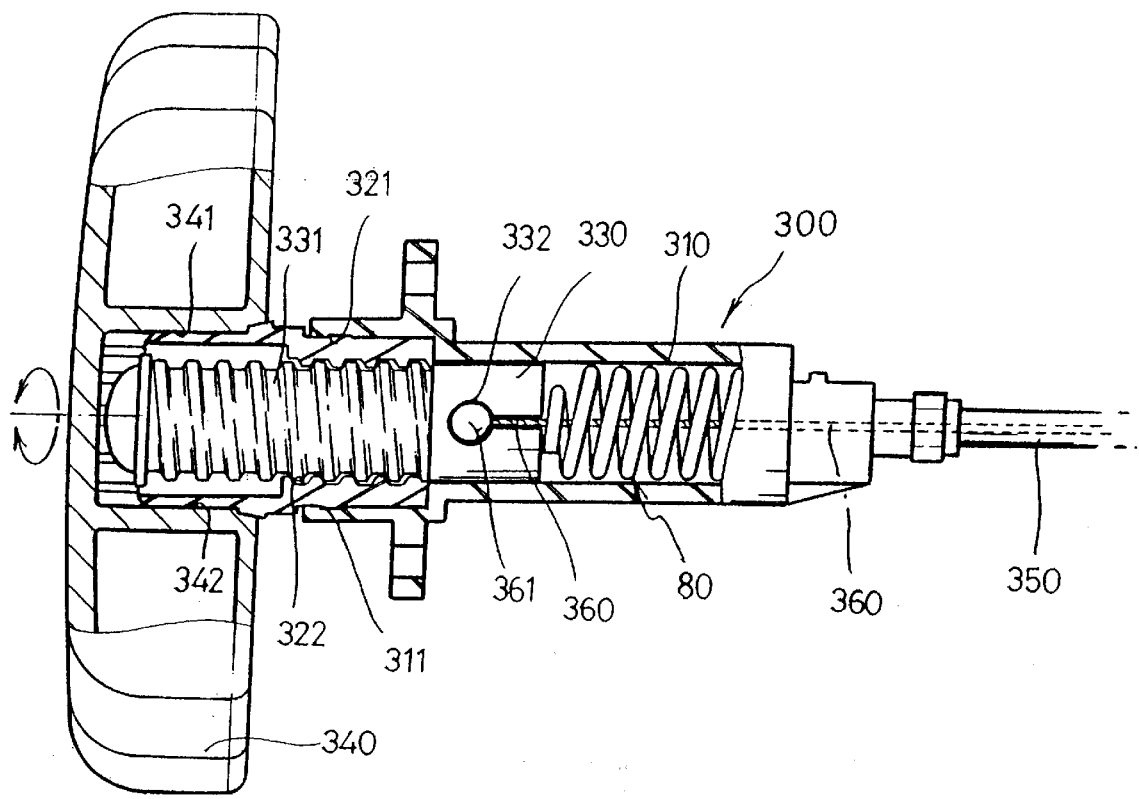
FIG. 4 is a cross-sectional view showing inside of the lumbar support controlling apparatus according to the present invention.

Referring to FIGS. 3 and 4, the handle 340 is rotated such the jagged portion 341 of the handle 340 is engaged with the grooves 342 and it ensures engagement of the sleeve 320 with the handle 340.

Between the housing 310 and the body 330, the elastic member 80 is mounted to maintain a stable tension returning force of the support plate 10 and the tension means 400.

The body 330 is pulled in one direction by the resilient tension spring 400 pulling the release wire 360 and in the other direction by the returning force of the support plate 10. Without the elastic member 80, the force of the release wire 360 and tension spring 400 would cause undue frictional resistance of the screw 331 of the body 330 and the internal thread 322 of the sleeve 320. The elastic member 80 functions counterbalance the force of tension spring 400 and to maintain elasticity between the body 330 and the housing 310 so that handle 340 can be turned with relative ease.

The prudent height controlling function of the support plate 10 with respect to rotation of the handle 340 of the controlling apparatus 300 is explained below.

The handle 340 and the sleeve 320 are engaged by the jagged portion 341 and the grooves 342 to make rotation thereto. In the lateral middle of the sleeve 320 the groove 321 is formed. The internal thread 322 is formed interior of the sleeve 320.

The groove 321 is rotatably engaged with the jaw 311 of the housing 310. The body 330 to be engaged with the internal thread 322 moves forward or backward along the spiral screw 331 in accordance with rotational direction of the handle.

In order to prevent rotation of the body 330 with the sleeve 320, a guide projection 333 is protruded on the body 330 as shown in FIG. 3.

A guide groove 312 is formed on the housing 310 for guiding the guide projection 333 at the corresponding position forward and backward.

With the elastic member 80 between the body 330 and the housing 310 the handle 340 rotates and the body 330 within the sleeve 320 moves in either direction. The fixation ball 361 of the release wire 360 is inserted to the groove 332 at the end of the body 330, such that longitudinal movement of body 330 causes corresponding longitudinal movement of the release wire 360.

Figure 5:
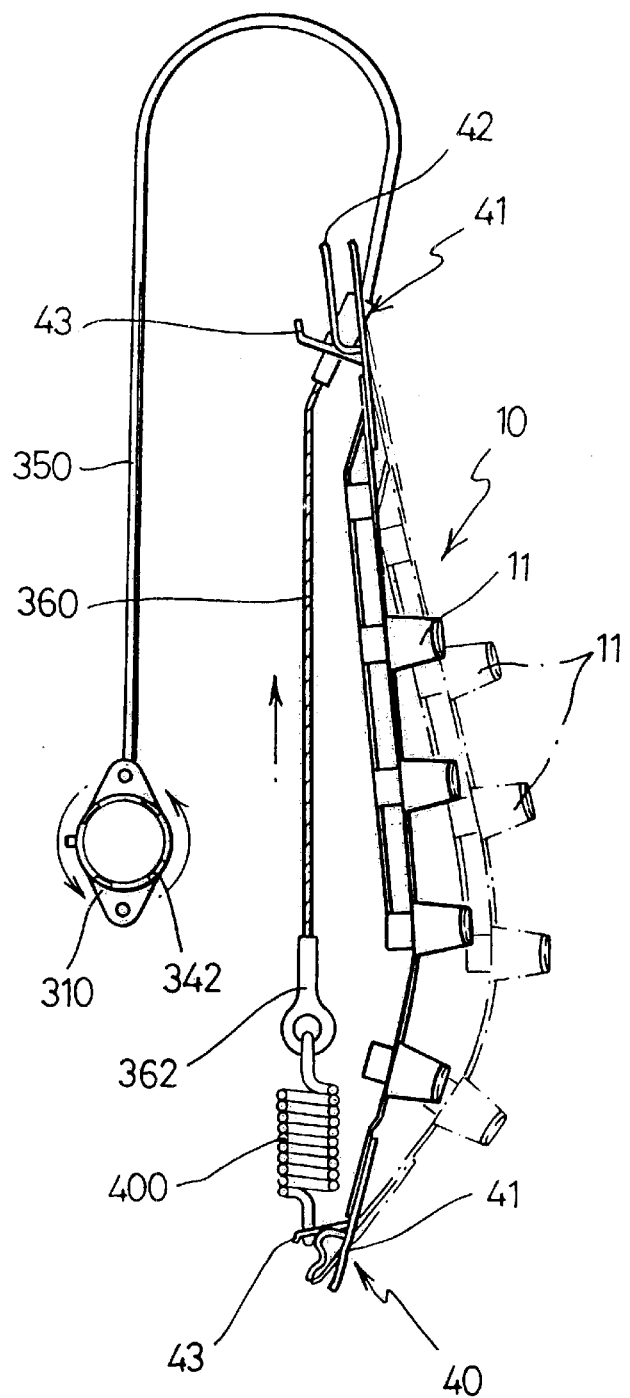
FIG. 5 is a partial cross-sectional view of the lumbar support controlling apparatus and the support plates.
Figure 6:
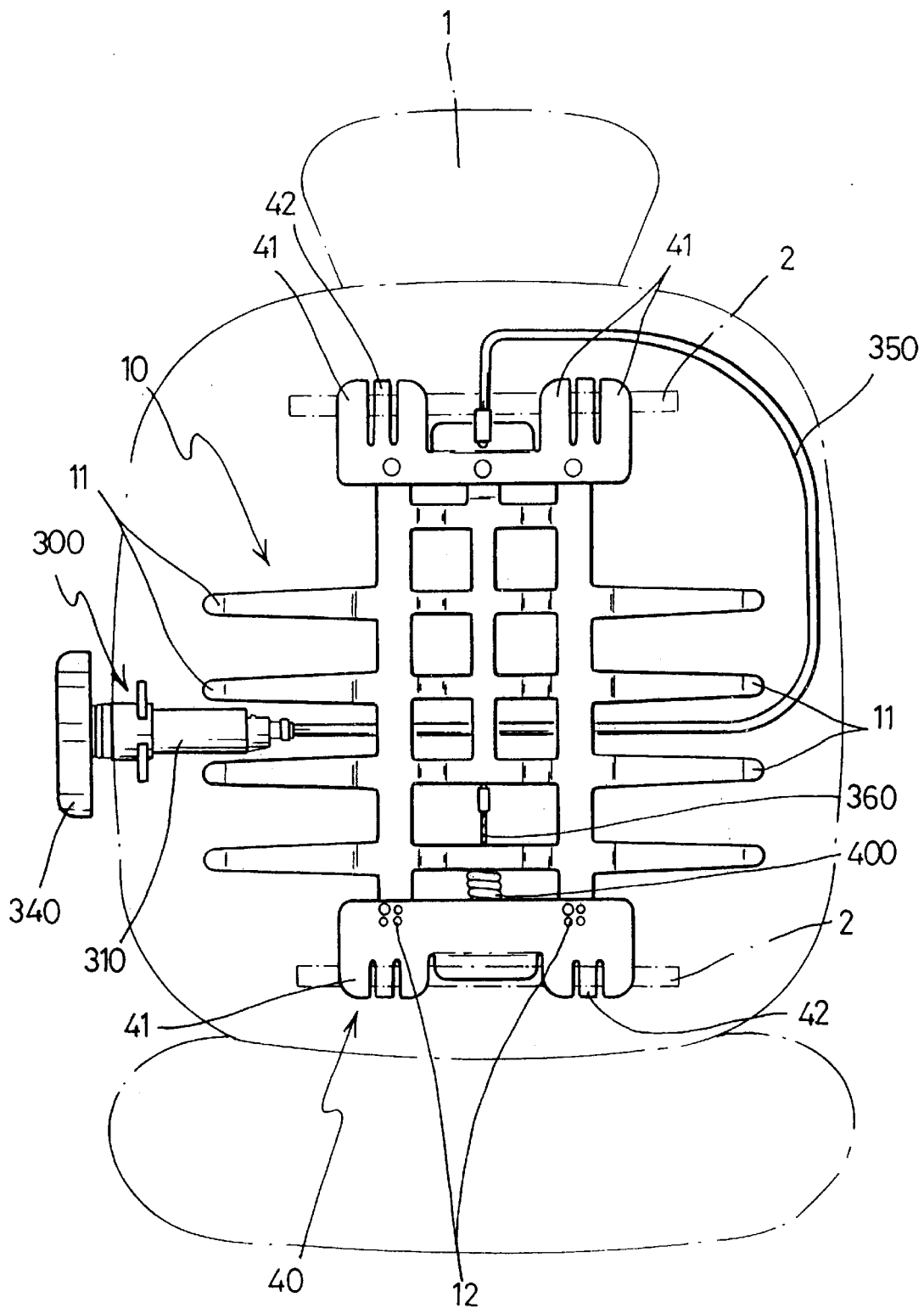
FIG. 6 is a schematic view showing the lumbar support according to the present invention, which is fixed on a car seat.

The release wire 360 is fixed by the resilient tension spring 400 to the fixation pin 362 at the flange 43 of the support plate 10, as shown in FIGS. 2 and 5.

Rotation of the handle 340 toward the support plate 10 pulls the release wire 360.

The cable 350 is not suspended to guiding movement of the release wire 360. While one of the flanges 43 of the support plate 10 is fixed to the cable 350, the release wire 360 fixed to the fixation pin 362 in the other flange 43. When the release wire 360 is pulled relative to the cable 350, the support plate 10 is curved or bent outward as a shown in dashed lines in FIG. 5. The degree of bending is controlled by spacing between the upper and lower flanges 43 of the locking member 40, and the spacing is controlled by movement of the release wire 360 relative to the cable 350.

Depending on the number and angle of rotation of the handle 340, movement of the release wire 360 is determined. Since the curved or bent state of the support plate 10 is directly proportional to movement of the release wire 360, the user may control the lumbar support height as necessary without preset steps.

Regardless of the exterior position of the handle 340 in the controlling apparatus 300, both ends of the release wire 360 keep the balance with elasticity by the elastic member 80.

The present invention allows the elastic member 80 to be inserted and mounted in the housing 310 of the controlling apparatus 300, thereby reducing the number of the necessary parts.

In the present invention, the elastic member 80 is mounted within the controlling apparatus 300 for maintaining elasticity of the support plate 10 and the tension spring 400 to keep the elastic balance, to accommodate simple operation of the body 330 and the handle 340. With easy manipulations of the handle 340, workability is improved.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed and desired to be secured by United States Letters Patent is:

1. In a controlling apparatus for a lumbar support of a car seat for supporting a lumbar region of a person, said controlling apparatus comprising:

a supporting plate (10) which protrudes in a center part thereof by selective bending and has locking holes (12) at both upper and lower end parts of a main body of said supporting plate, said supporting plate having a plurality of support wings (11) extending from said main body, wherein said supporting plate (10) is an elastic plate spring (1) for supporting the lumbar region of the person;

a locking member (40) fixed with the supporting plate by the locking holes (12) at the upper and lower end parts of the supporting plate (10), said locking member having upper and lower flanges (43);

a hollow cylindrical housing (310) having a jaw (311) at one end thereof and for controlling a height of the supporting plate (10) by controlling a spacing between the upper and lower flanges (43) of the locking member (40);

a sleeve (320) having a groove (321) in engagement with the jaw (311) of the housing (310), said sleeve having an internal screw thread (322) inside the sleeve (320);

a body (330) having a screw (331) in engagement with the internal screw thread (322) of the sleeve (320), and having a groove (332) at a rear end thereof;

a handle (340) in engagement with the sleeve (320) for rotation therewith;

a cable (350) made of a flexible material and connected to the housing (310) and one of said flanges (43) of the locking member (40);

a release wire (360) disposed within the cable (350) and having one end with a fixation ball (361) suspended in the groove (332) of the body (330), the other end of said release wire having a fixation pin (362) attached to the other of said flanges (43) of the locking member (40); and an elastic tension spring (400) located between the other end of the release wire (360) and the other of said flanges (43) of the locking member (40), for maintaining a tension of the release wire (360), and an elastic member (80) between the body (330) and the housing (310), that counterbalances an elastic tension of the tension spring (400) and an elastic release force of the supporting plate (10), wherein said elastic member (80) is a compression coil spring.

* * * * *